Jan. 8, 1952 W. J. B. JANSEN 2,581,796
TEMPERATURE MEASURING DEVICE
Filed Oct. 21, 1946 3 Sheets-Sheet 1

Inventor:
W. J. B. Jansen,
By Pierce, Scheffler & Parker,
Attorneys.

Jan. 8, 1952 W. J. B. JANSEN 2,581,796
TEMPERATURE MEASURING DEVICE
Filed Oct. 21, 1946 3 Sheets-Sheet 2
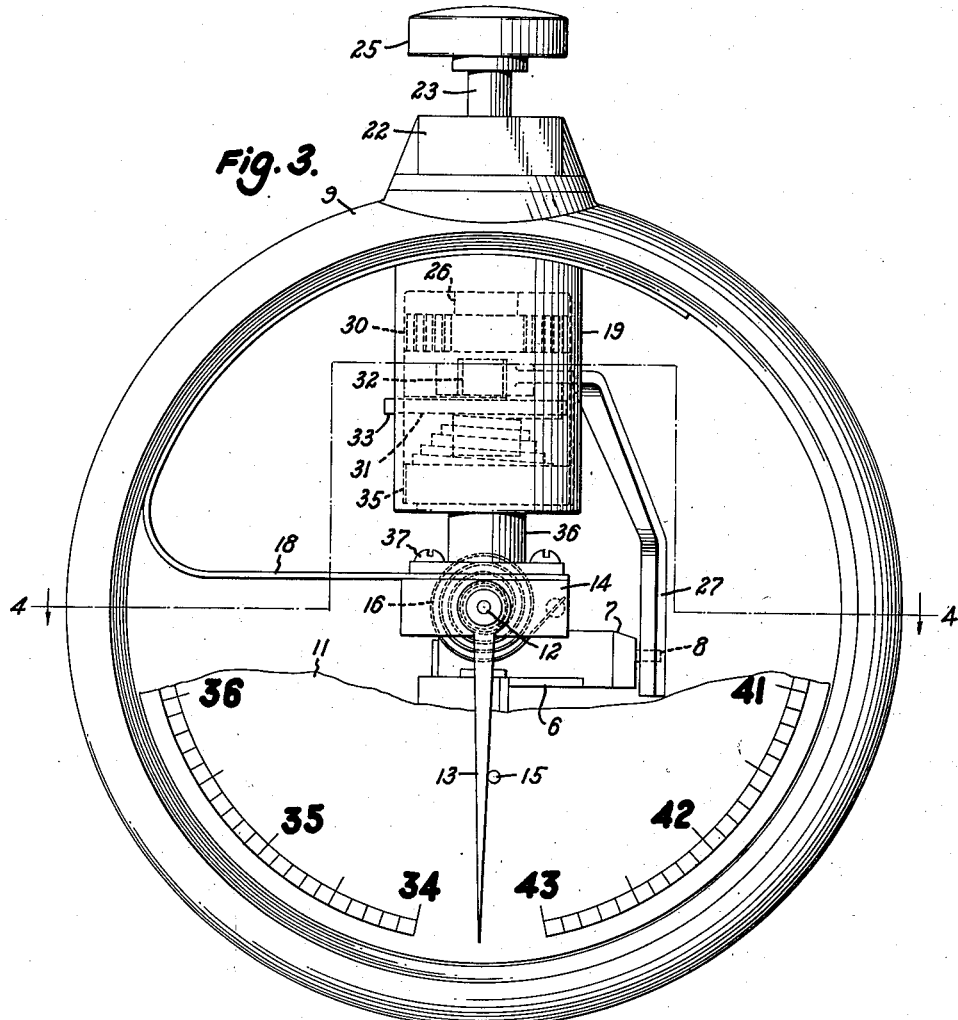
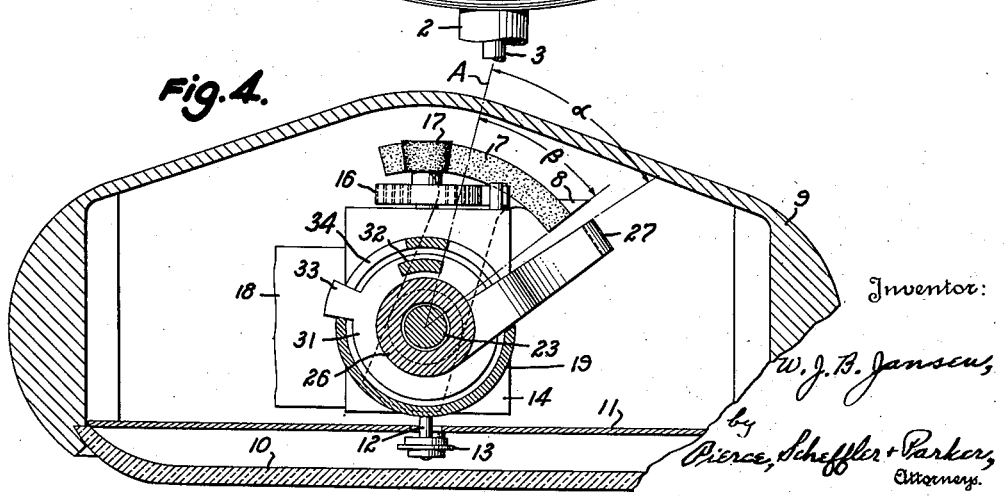
Inventor:
W. J. B. Jansen,
by Pierce, Scheffler + Parker,
Attorneys.

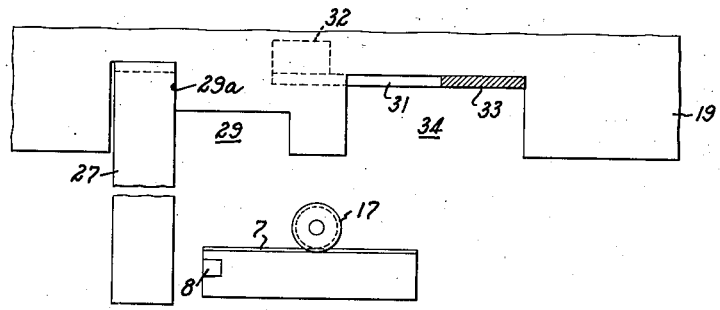
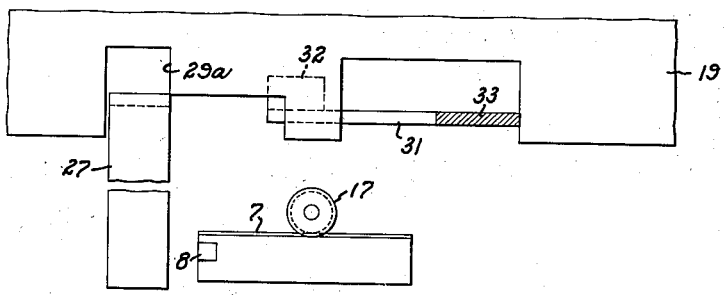
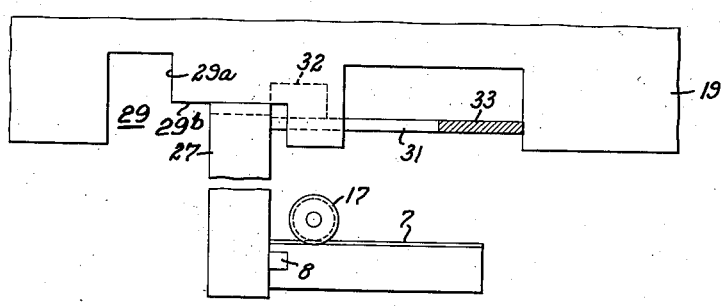
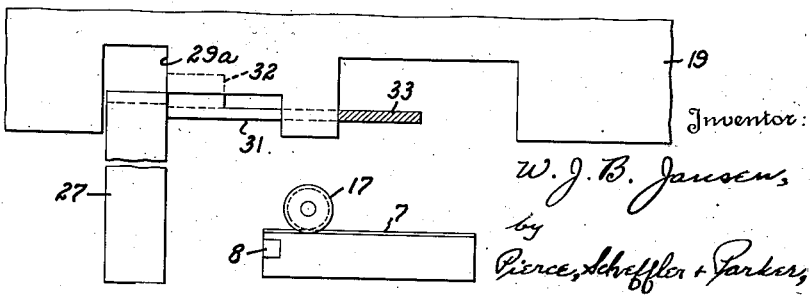

Patented Jan. 8, 1952

2,581,796

UNITED STATES PATENT OFFICE 2,581,796

TEMPERATURE MEASURING DEVICE

Willem J. B. Jansen, Haarlem, Netherlands

Application October 21, 1946, Serial No. 704,665

11 Claims. (Cl. 73—367)

This invention relates to devices for measuring or indicating the angular displacement of a rotatable shaft, and particularly to devices in which a pointer is coupled to the shaft by a motion-multiplying transmission when a reading is to be made, the pointer being retained in displaced indicating position until manually released.

The rotatable shaft may be the movable element of technical or scientific equipment of various types, and the invention is particularly useful in the accurate measurement of minute angular displacements of a shaft by forces of a magnitude too small to permit a permanent mechanical coupling of the shaft to the pointer through a motion-multiplying gearing. The invention will be described as incorporated in a thermometer of the bimetallic type but it is to be understood that the motion-multiplying indicating apparatus may be incorporated in other types of measuring instruments.

Objects of the invention are to provide indicating devices of relatively simple and rugged construction for the accurate measurement of small displacements of measuring elements by actuating forces of magnitudes too small to drive the indicating devices. An object is to provide an indicating device for a rotatable measuring element of low torque which includes mechanism for resetting the measuring element to a preselected end position at each actuation, and a pointer which is temporarily coupled to the measuring element and driven by the same during the resetting thereof. An object is to provide an indicating device, and a measuring instrument including an indicating device, which normally is not connected to the measuring element of the instrument; the indicating device including an operating arm which travels along a path of predetermined constant length at each actuation thereof, a drive member carried by the measuring element and extending into the path of the operating arm, whereby the drive member is reset to a definite position at each actuation of the operating arm, and a pointer to be coupled to the drive member during the resetting movement thereof.

These and other objects, and the advantages of the invention will be apparent from the following specification when taken with the accompanying drawings in which:

Fig. 3 is an elevation of the thermometer as seen from the left of Fig. 1;

Fig. 4 is a transverse section through the thermometer taken on section line 4—4 of Fig. 3; and Figs. 5 to 8 are fragmentary, schematic developments of the control elements and motion-transmitting elements of the indicating system.

Figure 1:
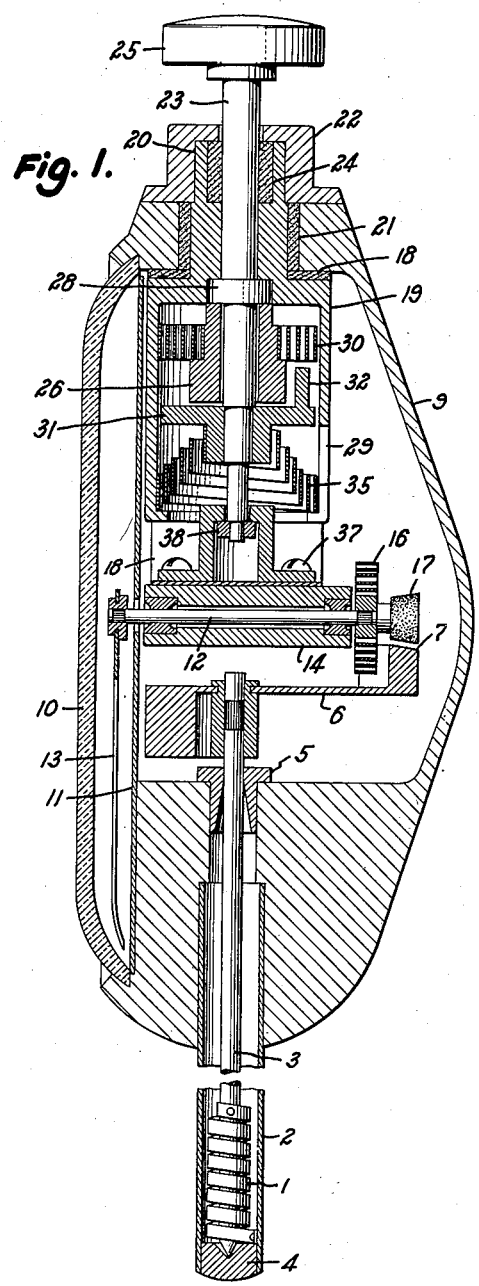
Fig. 1 is a central vertical section through a bimetallic thermometer including an indicating system embodying the invention.

In the drawings, the reference numeral 1 identifies a helical bimetallic element within a protective shell 2 and having its respective ends secured to the shell and to a staff 3. The staff 3 is supported on a step bearing 4 which closes the lower end of the protective shell 2 and extends through a cylindrical bearing 5 which is mounted in or above the upper end of the shell 2. A lever arm 6 is secured to the staff 3 and carries a counterbalanced arcuate segment 7 from which a lug 8 extends radially into the path of mechanism which will be described later. The protective shell 2 extends into and is hermetically sealed to a housing 9 which has a transparent glass or plastic closure plate 10 over a scale plate 11. The shaft 12 of pointer 13 is journalled in bearings mounted in a block 14 and is urged counterclockwise towards a stop pin 15 by a coiled spring 16 whose opposite ends are anchored on the shaft 12 and the bearing block 14. A small roller 17 secured to the rear of the pointer shaft 12 is urged downwardly towards frictional engagement with the arcuate sector 7 by a leaf spring 18 upon which the bearing block 14 is mounted. The bearing block is normally held in elevated position, by mechanism to be described hereinafter, to space the roller 17 from the sector 7, see Figs. 1 and 2. As shown in Fig. 3, the leaf spring 18 has a flat lower end which is secured to the bearing block 14 and an arcuate section which extends along the inner wall of the housing 9 and is clamped against the same by the upper end of the shell 19 which houses the mechanism for rotating the pointer shaft 12 when the roller 17 is depressed to engage the sector 7.

The hub or cylindrical extension 20 of the shell 19 extends through packing 21 in an opening in the upper part of the housing 9, the packing 21 serving to seal the interior of the housing and to provide a tight frictional fit which prevents inadvertent rotation of the shell 19 with respect to the housing. A cap 22 is pressed upon the reduced diameter upper end of the hub 20 to secure the shell 19 within the housing. The top portion of the hub 20 may be milled or knurled to provide a mechanical interlock with the cap 22, and the cap has diametrically opposed flat surfaces or is otherwise made of non-circular cross-section to receive a wrench by which the cap 22 and shell 19 may be adjusted angularly for calibration of the thermometer.

A push rod 23 extends downwardly through the cylindrical extension 20 of shell 19 and is sealed by packing 24, the rod having a push button or knob 25 on its upper end by which it may be depressed and rotated. The hub 26 of an operating arm 27 is journalled on the push rod 23, and a flange 28 of the pushrod bears upon the upper end of the hub. The arm 27 extends outwardly through an axially stepped slot 29 in the shell 19 and then downwardly for cooperation with the lug 8 of the sector. A coiled spring 30 is secured between the shell 19 and the hub 26, and tends to rotate the arm counterclockwise to engage the right hand edge of the slot 29.

A stop disk 31 is rigidly secured to rod 23 below the hub 26 and carries a stop pin or flange 32 which extends upwardly into the path of the operating arm 27. The stop disk has a limited range of angular movement which is determined by a radial arm 33 which extends through an axial slot 34 of the shell 19. A conical torsion spring 35 is located between the inturned lower flange of the shell 19 and the stop disk 31, and the spring is secured to the shell 19 and disk 31 to press the disk and push rod 23 upwardly and also to urge them in a counterclockwise direction.

Figure 2:
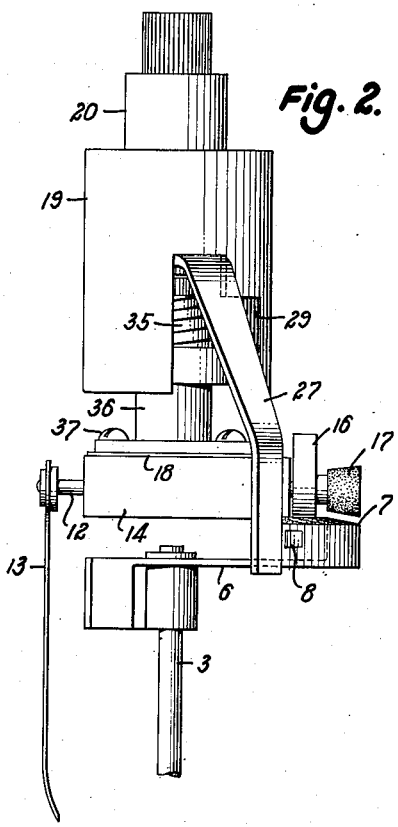
Fig. 2 is an elevation of the indicating system.

A hollow cap 36 is secured to the bearing block 14 by screws 37, and the reduced diameter lower end of the push rod 23 extends into the cap 36. A nut or stop ring 38 is secured to the end of the push rod 23 in such position that the bearing block is held in elevated position, as shown in Figs. 1 and 2, to separate the roller 17 from the arcuate sector 7 when the push rod is in normal elevated position.

The method of operation of the indicating device and thermometer will be apparent from a consideration of movable parts as viewed in transverse section in Fig. 4 and as shown schematically in the developments of the shell 19, Figs. 5 to 8 inclusive. The motion-multiplying indicating mechanism is normally held in elevated position by the spring 35, and the shaft 3 and its arcuate sector 7 are therefore moved angularly by the bimetallic coil 1 in accordance with changes in the temperature of the coil.

The operating arm 27 and the stop disk 31 are urged, by springs 30 and 35 respectively, in a counterclockwise direction as viewed in Fig. 4 and towards the right as viewed in Figs. 5 to 8 inclusive. The arm 27 is thus retained in a definite zero position by the side wall 29a of the deeper section of the axial slot 29 so long as the push rod 23 remains in raised position, and the stop 32 is retained in its operative end position by the engagement of the arm 33 with the edge of the slot 34, see Fig. 5. The arm 27 is released for angular movement by the spring 30 when pressed downwardly by the push rod 23 to clear the lower end of the side wall 29a, see Fig. 6, and it moves to the right, as viewed in Fig. 7, a constant predetermined distance to engage the stop 32 which was also moved downwardly by the push rod 23. The movement of the operating arm 27 is actually a rotation, as indicated in Fig. 4, through an angle α. The arm 27 contacts the lug 8 of the sector 7 during this travel and thus moves the sector 7 counterclockwise through an angle β, see Fig. 4, or towards the right in the schematic development, Fig. 7.

This movement of the sector 7 to reset the lug 8 of the drive sector in the plane indicated by the radial line A of Fig. 4 is of course equal in magnitude and opposite in sense to the angular displacement of the floating end of the bimetallic coil 1 upon an increase in the temperature of the coil above the minimum graduated value of the scale 11. The particular scale values will depend upon the type and effective range of the measuring instrument. The graduations shown in Fig. 3 are appropriate for a clinical thermometer for the measurement of body temperature over a range of several degrees above and below normal body temperature.

The roller 17 of the pointer shaft 16 was moved downwardly, by the leaf spring 18, when the push rod 23 was depressed, and the angular movement of the sector 7 thus results in a multiplied angular displacement of the pointer 13 along the scale 11.

The pointer 13 is retained in displaced measuring position upon the release of the manual pressure upon the knob 25 of the push rod 23 as the operating arm 27 is locked against upward movement by the circumferential edge 29b of the stepped slot 29, see Fig. 7, and the push rod 23 is thus held in depressed position which permits the leaf spring 18 to hold the pointer shaft roller 17 in engagement with the arcuate sector 7. The measuring apparatus is reset by manually turning the knob 25 of push rod 23 clockwise, thereby rotating the stop disk 31 and stop 32 clockwise to force the operating arm 27 towards the left, see Fig. 8, into axial alinement with the deeper section of the axial recess 29. The push rod 23 and associated elements are lifted by the spring 35 to return the operating arm 27 to its initial position and, upon release of the torque applied manually to the knob 25 of push rod 23, the spring 35 turns the stop disk counterclockwise into normal position as shown in Fig. 5. The pointer 13 is moved counterclockwise into engagement with stop 15 when the drive connection is broken by the lifting of the push rod 23.

Although the measuring apparatus is substantially hermetically sealed within the casing 9, a zero adjustment from the exterior of the casing may be made by applying a tool to the cap 22 to move the shell 19 angularly and thus bring the pointer indication into agreement with the existing value of the temperature or other variable factor as measured by a precision instrument of high accuracy.

It is to be understood that the invention is not limited to the specific apparatus as herein illustrated and described since various modifications which may occur to those familiar with the art fall within the spirit and scope of the invention as set forth in the following claims.

I claim:

1. Mechanism for indicating the movement of a measuring element of low torque and of the type including a measuring system and an indicating system normally disconnected from each other to permit free movement of the measuring system, manually controlled means for coupling said systems through a motion-transmitting mechanism, and operating means for actuating said motion-transmitting mechanism to an extent dependent upon the free movement of said measuring system; characterized by the fact that said operating means includes an operating member movable over a path of constant length on each actuation thereof, and said motion-transmitting mechanism includes a member carried by said measuring system and extending into the path of movement of said movable member of the operating means.

2. Mechanism as recited in claim 1 wherein means is provided for adjusting the location of the constant length path of said operating member with respect to said measuring system.

3. Mechanism as recited in claim 1 wherein said motion-transmitting mechanism is of a motion-multiplying type.

4. Mechanism for indicating the movement of a measuring element of low torque, said mechanism comprising a pointer movable along a scale, a motion-transmitting mechanism including a driving member carried by said measuring element and a driven member connected to said pointer, means normally maintaining said members in spaced disconnected relation, manually actuated means for effecting an operative engagement of said members, an operating arm movable over a path of constant length at each actuation thereof, means for displacing said arm over its constant length path upon actuation of said manually actuated means, and means connected to said measuring element and extending into the path of said operating arm for actuation thereby to operate said motion-transmitting mechanism to an extent determined by the movement of the measuring element.

5. Mechanism for indicating the movement of a measuring element of low torque, said mechanism comprising an indicating element supported for movement along a scale, motion-transmitting means including a driving member carried by the measuring element and a driven member connected to said indicating member, means normally retaining said members in spaced disconnected relation, manually controlled means for effecting an operative engagement of said driving member and said driven member, and an operating arm movable over a path of fixed length at each actuation thereof, said driving member including means extending into the path of movement of said operating arm; whereby end position by the operating arm and the movethe driving member is returned to a preselected ment of the driving member, and thereby of the indicating element, depends upon the particular position into which the driving member was displaced by said measuring element.

6. Apparatus for indicating the angular displacement of a rotatable measuring element of low torque, said apparatus comprising a pointer movable over a scale, a motion-transmitting mechanism including a driving member carried by said measuring element and a driven member connected to said pointer, means normally maintaining said members in spaced disconnected relation, manually actuated means for effecting an operative engagement of said members, an operating arm and means for rotating the same through a predetermined angle at each actuation of said manually actuated means, and means associated with said measuring element and extending into the path of movement of said operating arm for actuation thereby to operate said motion-transmitting mechanism in accordance with the existing angular displacement of said measuring element.

7. Apparatus as recited in claim 6 wherein means is provided for latching the operating arm in its end position upon completion of its rotation through a predetermined angle, in combination with means operable manually to restore said operating arm to its initial position and to return said members of the motion-transmitting mechanism to spaced disconnected relation, thereby to render said motion-transmitting mechanism inoperative.

8. Apparatus as recited in claim 6, in combination with means mounting said operating arm for manual adjustment of its end positions angularly with respect to said rotatable measuring element.

9. A thermometer comprising a temperature-responsive element of low torque, an indicating element supported for movement along a scale, a motion-transmitting mechanism including a driving member carried by said temperature-responsive element and a driven member connected to said indicating element, means normally maintaining said members in spaced disconnected relation, an operating arm supported for angular movement about the axis of said temperature-responsive element, means limiting the displacement of said operating arm to a preselected angle, drive means connected to said temperature-responsive element and extending into the path of said operating arm, whereby actuation of said operating arm over its angular path displaces said driving member through an angle dependent upon the particular position into which said drive means was displaced by said temperature-responsive element, and manually actuated means for effecting an operative engagement of said members of the motion-transmitting mechanism and for displacing said operating arm over its angular path.

10. A thermometer as recited in claim 9, wherein said motion-transmitting mechanism includes motion-multiplying means.

11. A thermometer as recited in claim 10, in combination with means supporting said operating arm for adjustment of the relative angular relation of the end positions thereof with respect to angular displacement of said temperature-responsive element.

WILLEM J. B. JANSEN.

REFERENCES CITED

The following references are of record in the file of this patent:

UNITED STATES PATENTS

| Number | Name | Date |
|---|---|---|
| 2,117,287 | Bloch | May 17, 1938 |
| 2,316,391 | Bloch | Apr. 13, 1943 |